United States Patent
Husby et al.

[11] Patent Number: 6,079,744
[45] Date of Patent: Jun. 27, 2000

[54] DEVICE TO DETECT SEAT BELT BUCKLE STATUS

[75] Inventors: Harald Snorre Husby; Vihang C. Patel, both of Lakeland; Ashok F. Patel, Wesley Chapel, all of Fla.

[73] Assignee: Breed Automotive Technology, Inc., Lakeland, Fla.

[21] Appl. No.: 09/065,684

[22] Filed: Apr. 24, 1998

[51] Int. Cl.$^7$ .................................................. B60R 22/00
[52] U.S. Cl. ...................... 280/801.1; 180/268; 24/633
[58] Field of Search .................. 280/801.1; 180/268, 180/270; 24/303, 633

[56] References Cited

U.S. PATENT DOCUMENTS

| | | | |
|---|---|---|---|
| 3,766,612 | 10/1973 | Hattori | 24/230 A |
| 4,928,366 | 5/1990 | Ballet | 24/641 |
| 4,984,651 | 1/1991 | Grösch et al. | 180/268 |
| 4,995,640 | 2/1991 | Saito | 280/804 |
| 5,060,977 | 10/1991 | Saito | 280/802 |
| 5,109,199 | 4/1992 | Berger | 324/415 |
| 5,133,425 | 7/1992 | Han | 180/270 |
| 5,174,600 | 12/1992 | Jahn et al. | 280/733 |
| 5,406,252 | 4/1995 | Dear | 340/457.1 |
| 5,483,221 | 1/1996 | Mutter et al. | 340/457.1 |
| 5,590,904 | 1/1997 | Ellis et al. | 280/735 |
| 5,672,916 | 9/1997 | Mattes et al. | 307/10.1 |
| 5,675,134 | 10/1997 | Swart et al. | 200/61.45 M |
| 5,689,421 | 11/1997 | Görnig | 364/424.055 |
| 5,742,986 | 4/1998 | Corrion et al. | 24/633 |
| 5,752,986 | 5/1998 | Vivacqua et al. | 24/633 |
| 5,839,174 | 11/1998 | Chamings et al. | 24/633 |
| 5,898,366 | 4/1999 | Brown et al. | 180/270 |

FOREIGN PATENT DOCUMENTS

| | | |
|---|---|---|
| 234458 | 2/1987 | European Pat. Off. . |
| 893314 | 1/1999 | European Pat. Off. . |
| 2468486 | 5/1981 | France . |
| 19647320 | 12/1997 | Germany . |
| 19630108 | 1/1998 | Germany . |
| 35868 | 9/1988 | Japan . |
| 40045 | 10/1988 | Japan . |

*Primary Examiner*—Paul N. Dickson
*Attorney, Agent, or Firm*—Lonnie R. Drayer; Beth A. Vrioni

[57] ABSTRACT

A seat belt buckle and latch indicating system employs a seat belt buckle with a Giant Magnetoresistive (GMR) sensor spaced from a magnet above a gap through which a ferromagnetic latch protrudes. The latch may reside at three distinct positions: unlatched, latched, and latched without the presence of a hasp. The latch functions as a magnetic field concentrator with the result that the sensed magnetic field is dependent on latch position. The GMR sensor provides a signal indicating the sensor is working at all times, and provides specific information based on physical positioning of the critical components of the belt and which indicates that the buckle is mated to the seat belt hasp.

14 Claims, 5 Drawing Sheets

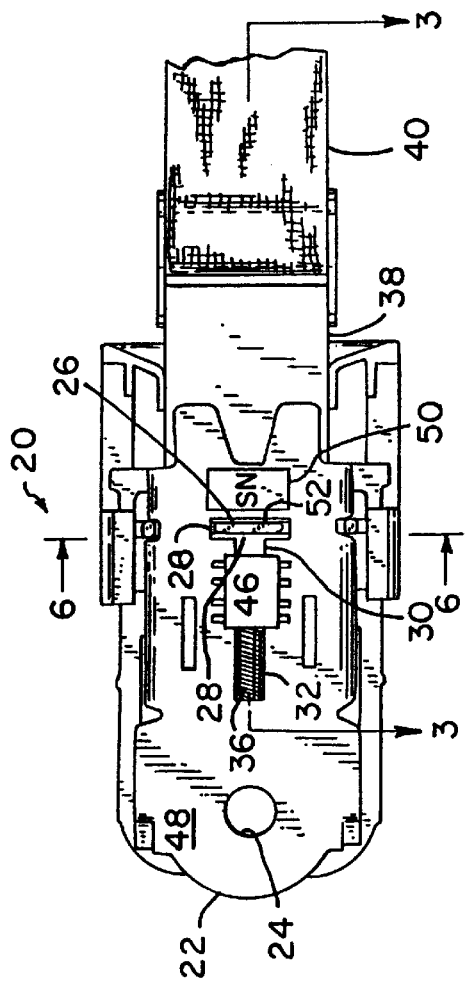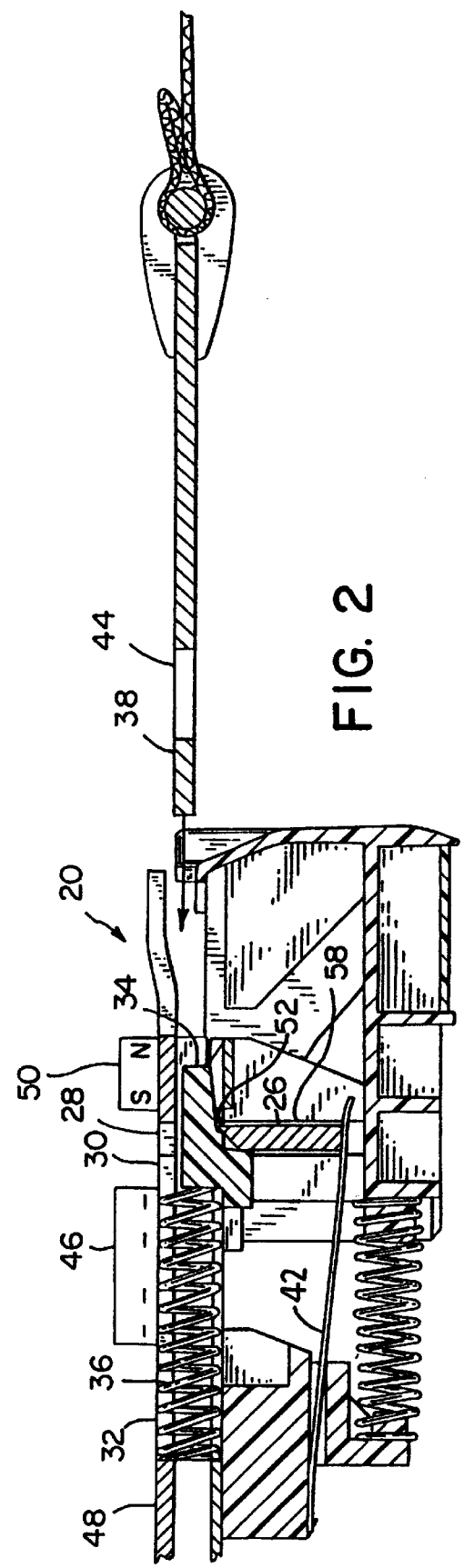

DEVICE TO DETECT SEAT BELT BUCKLE STATUS

FIELD OF THE INVENTION

The present invention relates to seat belts for vehicles and switches or sensors for determining if a seat belt is buckled.

BACKGROUND OF THE INVENTION

Sensors to determine if a seat belt is buckled were first widely used to alert or remind the occupants of a motor vehicle to fasten their seat belts. Recently, airbags have been used in vehicles to enhance and complement the protection provided by seat belts. This combination of seat belts and airbags can be optimized if it can be determined that the seat belt is actually in use. If the seat belt is buckles then the deployment of an airbag can be optimized to protect a seat-belted occupant. Accurate sensing information of seat-belt latch status is far more important when used as part of the decision logic and deployment strategy of an airbag system then when used simply as part of a seat belt fastening reminder system.

A typical seat belt latch indicating system such as might be used in combination with an airbag deployment system, is a mechanical switch within the buckle of a seat belt combined with a resistor network. The simplest resistor network has a first resistor connected in series with the switch and a second resistor connected in parallel with the switch. Thus the resistance of the switch and the resistor network changes when the switch is closed. But the switch, because of the resistor connected in parallel across the opens leads of the switch, can be positively monitored when opened. Thus if resistance falls to zero or has a resistance value substantially different from the two designed states of the switch and resistor network, it is clear that the seat belt latch detector is broken.

The installed seat belt environment can be a hostile one. The switch may be called upon to operate even when dirty, wet, or even when coated with residue from spilled beverages. Further, the use of seat belt latch sensors to sound reminder chimes or a buzzer is sometimes perceived as annoying, and can lead those resistant to wearing safety belts to disable a seat belt latch indicator by causing the buckle to latch without engaging the hasps of the belt. Where seat belt latching information is being used by an airbag deployment logic, the folly of disabling safety equipment can prevent the deployment logic from making the best possible decision by providing false information to the logic.

What is needed is a seat belt latch indicator which is both durable and better able to monitor latch status.

SUMMARY OF THE INVENTION

The seat belt buckle and latch indicating system of this invention employs a seat belt buckle that incorporates a magnetoresistive sensor and a magnet. The seat belt buckle incorporates a latch which retains the seat belt hasp within the buckle. The latch has three positions: unlatched, latched, and latched without the presence of an engaged hasp. The latch is constructed of a ferromagnetic material, typically high strength steel, and assumes one of three positions relative to the magnetoresistive sensor and the magnet depending on which of the three positions possible for the latch. The latch functions as a magnetic field concentrator with the result that the sensed magnetic field is dependent on latch position.

Thus a seat belt latch sensor is provided which provides a signal indicating the sensor is working at all times, and provides specific information based on physical positioning of the critical components of the belt that the latch is actuated and that the buckle is mated to the seat belt hasp. The preferred magnetoresistive sensor is of the Giant Magnetoresistive (GMR) type.

It is a feature of the present invention to provide a seat belt latch sensor of improved reliability.

It is another feature of the present invention to provide a seat belt buckle and latch sensor which provides an indication of actual retention of the belt hasp within the buckle.

It is a further feature of the present invention to provide a seat belt buckle and latching sensor which is less easily tempered with.

Further objects, features and advantages of the invention will be apparent from the following detailed description when taken in conjunction with the accompanying drawings.

BRIEF DESCRIPTION OF THE DRAWINGS

FIG. 1 is a bottom plan view of the seat belt buckle of this invention.

FIG. 2 is an cross-sectional view of the seat belt buckle of FIG. 1 in an unlatched condition, with the seat belt hasp exploded from the buckle.

DETAILED DESCRIPTION OF THE INVENTION

Figure 3:
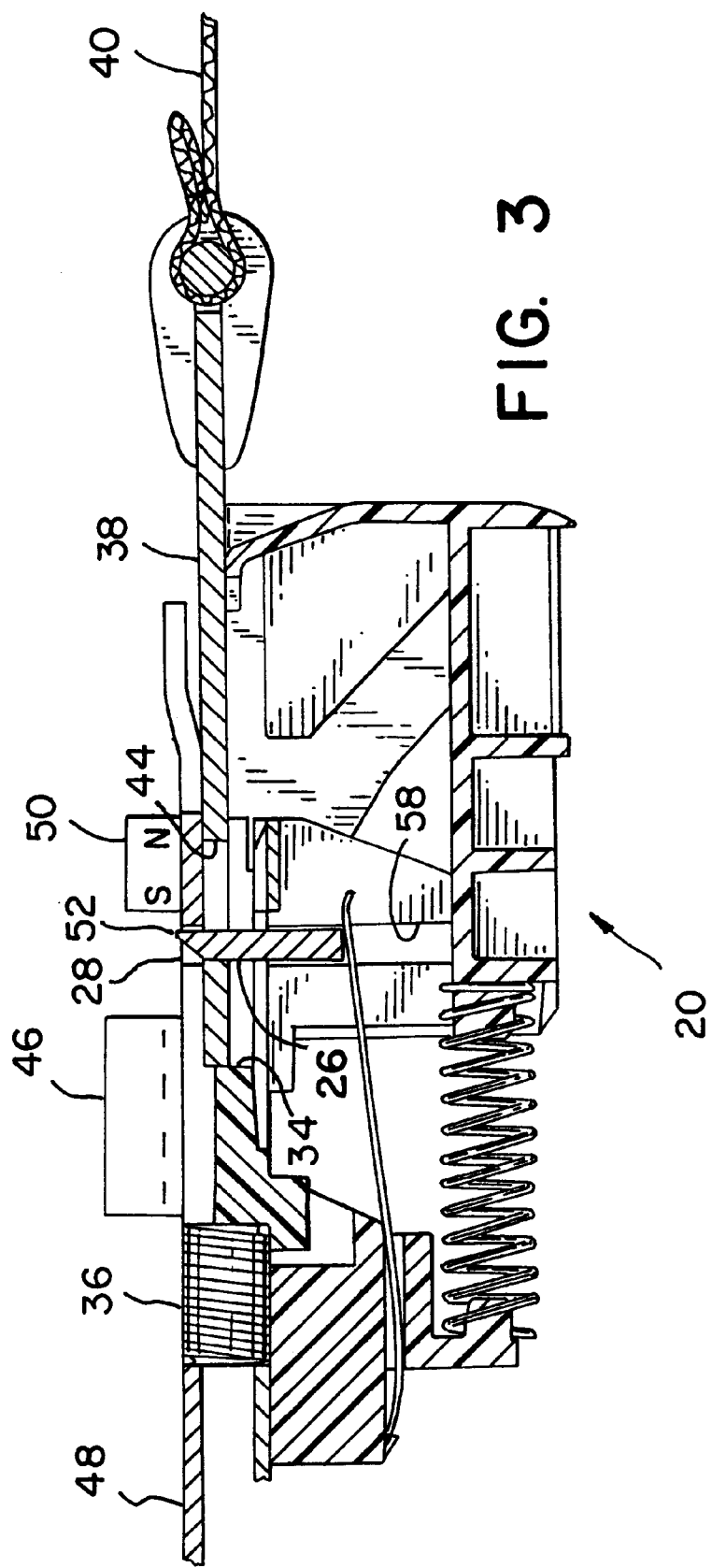
FIG. 3 is a cross-sectional view of the latched seat belt buckle of FIG. 1 taken along section line 3—3.

Referring to FIGS. 1–9 wherein like numbers refer to similar parts, a seat belt buckle 20 is shown in FIGS. 1–3. The seat belt buckle 20 has a body 22. The body 22 has an anchor hole 24 by which the seat belt buckle 20 is attached to a structural component (not shown) of a motor vehicle (not shown). The body 22 has a transverse slot 28 into which a spring-loaded latch 26 extends when a seat belt is connected to the buckle. The transverse slot 28 forms the top of a T-shaped slot 30. The body of the T-shaped slot 30 is formed by a longitudinal slot 32. A slidable ejector 34 is captured between parallel plates of the body is restrained to slide laterally in the direction of the longitudinal slot 32. The ejector is biased by a spring 36 towards the latch 26.

The safety belt 40 terminates in a flat steel plate having a central hole therein which defines a seat belt hasp 38. The belt 40 loops around a passenger for restrain within a motor vehicle. When a passenger inserts the belt hasp 38 into the buckle 20, the ejector 34 is depressed until the latch 26, under the influence of a latch spring 42, passes through the latch hole 44 in the hasp and through the transverse slot 28 in the buckle body. When the latch 26 extends through the hasp 38, the buckle body 22 is locked to the hasp, and the belt is secured by the buckle body to a structural component of a motor vehicle, thus positively connecting the passenger to the vehicle.

A magnetic field sensor 46 of the Giant Magnetoresistive (GMR) effect type is mounted to the outside surface 48 of the seat belt body 22 overlying the longitudinal slot 32. A magnet 50 is mounted to the outside surface 48 of the seat belt body 22 and is located across the transverse slot 28 from the GMR sensor 46.

The GMR sensor 46 measures the magnetic field intensity at the location of the sensor 46. The magnet 50 produces a local field which the GMR sensor 46 detects. The latch 26 is constructed of high strength steel which is a ferromagnetic material. The body 22 of the seat belt buckle 20 is a steel high strength stamping. In the presence of a magnetic field, such as produced by the magnet 50, ferromagnetic materials concentrate the lines of magnetic flux resulting in a magnetic field of greater strength at a greater distance from the source of the magnetic field.

The T-shaped slot 30, in particular the transverse slot 28, diminishes the effectiveness of the ferromagnetic seat belt buckle body 22. However the latch 26, by filling the transverse slot 28 with a ferromagnetic body, namely the nose 52 of the latch 26, improves the concentration of field lines which results in a greater magnetic flux being present at the sensor 46. Thus a positive indication that the hasp 38 is locked within the buckle 20 is provided.

The sensor 46 senses static magnetic fields. The sensor is of the GMR type and utilizes an effect discovered in 1988. The effect utilizes a phenomenon discovered in thin film devices that resistors built up of thin magnetic film a few nanometers thick separated by equally thin nonmagnetic layers have resistance which depends on the strength of a magnetic field applied to the resistor.

A decrease in resistance of between about 10 and 20 percent in the built-up resistors is observed when a magnetic field is applied. The physical explanation for the decrease in resistance is the spin dependence of electron scattering and the spin polarization of conduction electrons in ferromagnetic metals.

The extremely thin adjacent magnetic layers couple antiferromagnetically to each other so that the magnetic moments of each magnetic layer are aligned antiparallel to adjacent magnetic layers. Electrons, spin polarized in one magnetic layer, are likely to be scattered as they move between adjacent layers. Frequent scattering results in high resistance. An external magnetic field overcomes the antiferromagnetic coupling and produces parallel alignment of moments in adjacent ferromagnetic layers. This decreases scattering and thus device resistance.

Groups of four resistors based on the GMR technology are arranged in a Wheatstone bridge and two legs of the bridge are shielded from the applied magnetic fields. The other two legs are positioned between the magnetic shields. The magnetic shields act as flux concentrators to produce a device of tailored sensitivity to a magnetic flux of a selected intensity. A standard voltage, or current is supplied to the solid state device 46, while a value relating to current or voltage is read out which is proportional to the magnetic field to which the device is exposed. The devices have an axis of sensitivity which is produced by the orientation of the magnetic flux shields. In the sensor 46 this axis is aligned with the longitudinal slot 32 of the T-shaped slot 30, and passes through the magnet 50.

GMR sensors are available from Nonvolatile Electronics Inc. of 11409 Valley View Rd., Eden Prairie, Minn. (www.nve.com). GMR sensors are small, highly sensitive devices which have exceptional temperature stability, deliver high signal levels and require very little power and cost less than many competitive devices. All these factors are important in devices used in automobile safety applications.

Figure 6:
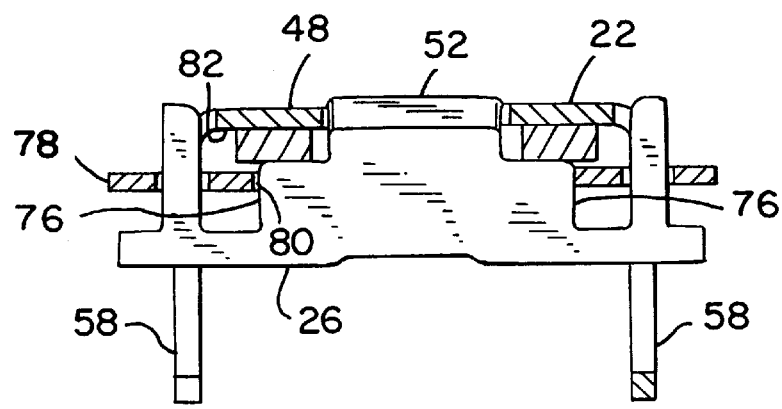
FIG. 6 is a schematic cross-sectional view of the seat belt buckle of FIG. 1 taken along section line 6—6.
Figure 7:
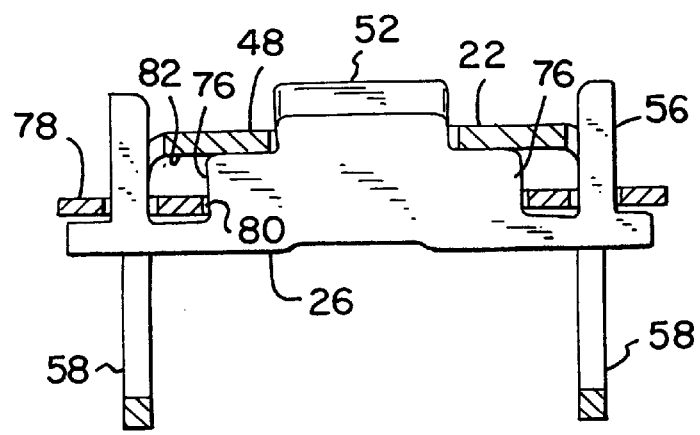
FIG. 7 is a schematic cross-sectional view of the belt buckle of FIG. 1 shown in the actuated position when a seat belt hasp is not present.

A simple switch actuated by fastening a seat belt can be used to determine if a seat belt is latched. The GMR sensor 46 however provides a qualitative indication of latching. The output of the GMR sensor 46 assumes one value when the buckle 20 is not latched and another value when the hasp 38 is latched within the buckle 20. Further, the design of the seat belt buckle 20 is such that the position of the latch depends on whether a seat belt hasp 38 is locked in the buckle 20. As shown in FIGS. 6 and 7, if a hasp is not present the latch 26 moves further towards a gap 54 formed between the sensor 46 and the magnet 50. This results in a different value or output from the sensor 46 in situations in which the latch is engaged but no hasp is present. Conventional sensors which simply detect whether a seat belt is latched can be fooled by causing the latch to move to the lock position without inserting the hasp.

The latch 26, as shown in FIGS. 6 and 7, has a nose 52 and vertical guides 56 which move in slots 58 formed in the body 22. The latch 26 is biased towards the slot 28 by a leaf spring 42. These elements are common to existing seat belt buckles as illustrated in FIGS. 4 and 5.

Figure 4:
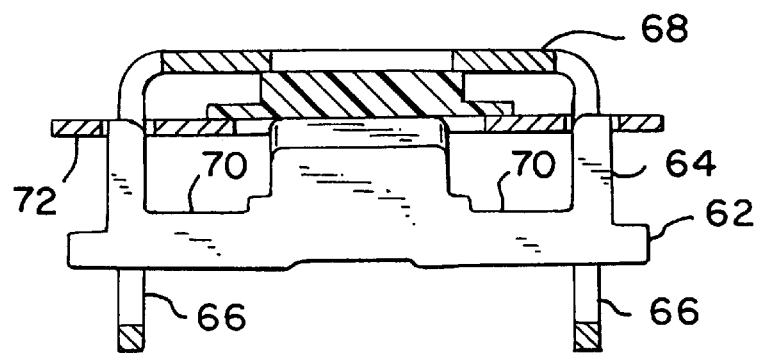
FIG. 4 is a schematic cross-sectional drawing of a prior art seat belt latch.

In FIG. 4 a conventional latch 62 in a prior art buckle is shown in the unlatched position. The latch 62 has vertical guides 64 which move in slots 66 formed in a conventional seat belt buckle body 68. When the conventional latch 62 is in the latched position, as shown in FIG. 5, portions 70 of the latch 62 engage against an inner plate 72 so that the travel of the latch 62 is limited by the plate 72. Thus a hasp 74 positioned between the body 68 and the plate 72 does not affect the position assumed by the latch 62 when it is latched.

Figure 5:
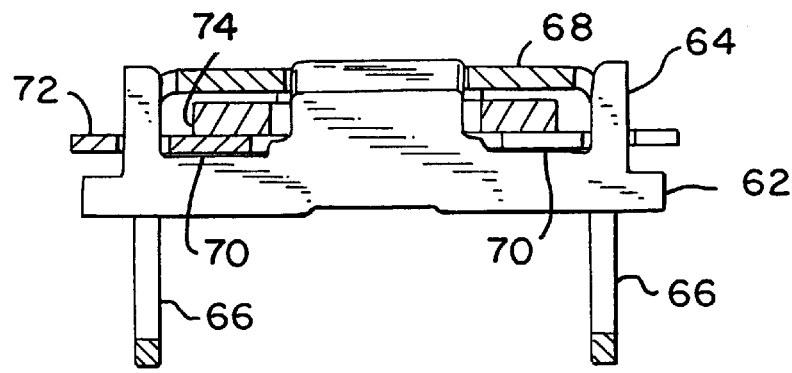
FIG. 5 is a schematic cross-sectional drawing of the prior art seat belt latch of FIG. 4 shown in a latched position.

While it is within the scope of the disclosed invention to employ a magnetic field sensor with a conventional seat belt buckle, such as the one illustrated in FIGS. 4 and 5, the preferred embodiment as illustrated in FIGS. 1–3 and 6–7 employs a latch 26 which has a face 76 which extends on either side of the nose 52. The face 76 abuts the hasp 38 when the buckle 20 is latched, as shown in FIG. 6. The inner plate 78 has an opening 80 which allows the face 76 of the latch 26 to move towards the body 22. If the seat belt buckle 20 is caused to be latched without the presence of the hasp 38 as illustrated in FIG. 7, the face 76 engages against the inner surface 82 of the body 22.

This positioning of the latch 26 with the nose 52 extending above the outer surface 48 of the body 22 towards the gap 54 between the magnet 50 and the sensor 46 produces a distinct signal which allows a microprocessor (not shown) to consider the actual state of the seat belt buckle 20 and whether it is securely mated to the seat belt hasp 38. The microprocessor will typically be connected to other sensors (not shown) including shock sensors for detecting a crash and will deploy or not deploy an airbag (not shown) based on logic which considers all sensor inputs.

Figure 8:
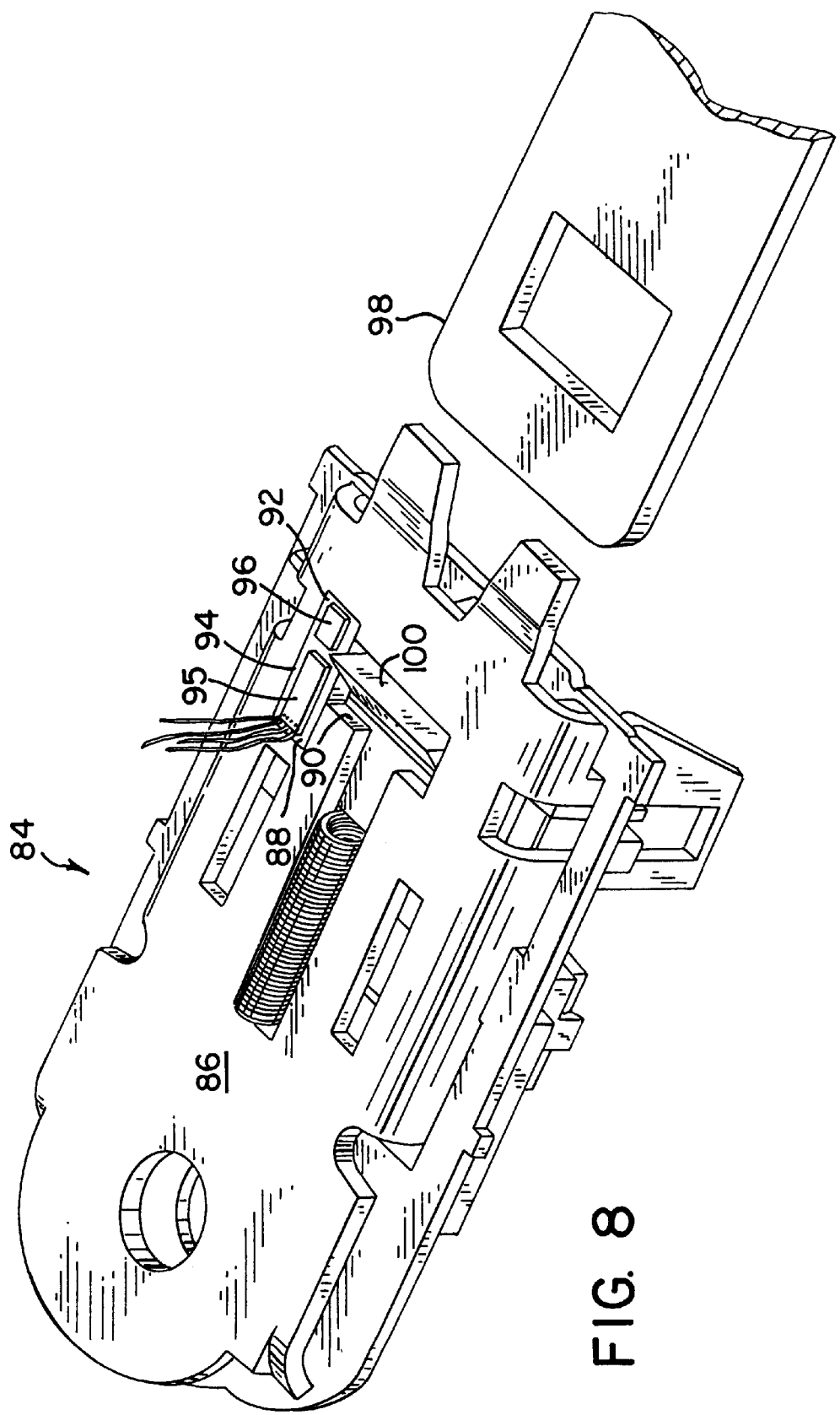
FIG. 8 is an isometric bottom view of an alternative embodiment seat belt buckle and sensor assembly of this invention.

An alternative embodiment seat belt buckle 84 is shown in FIG. 8. The seat belt buckle 84 has a body 86 similar to the body shown in FIG. 1, except that an opening 88 is formed adjacent to and continuous with a transverse slot 90. A sensor housing 92 is positioned in the opening 88. The sensor housing 92 incorporates a GMR sensor 95 on a circuit board 94 and a magnet 96 spaced a short distance from the GMR sensor 95. The GMR sensor 95 and the magnet 96 are positioned so that when the hasp 98 is engaged with the buckle 84 both the magnet 96 and the GMR sensor 95 engage or are closely spaced from the hasp 98. In this way the GMR sensor 95 directly detects the presence of the hasp 98. The motion of the latch 100 through the transverse slot 90 is also sufficiently close to the gap between the magnet 96 and the GMR sensor that the presence of the latch 100 can also be directly sensed. With the GMR sensor 95 and magnet 96 positioned to directly detect the presence of the hasp 98 a conventional buckle with a two-position motion of the latch 100, as illustrated in FIGS. 4 and 5, can be employed.

Figure 9:
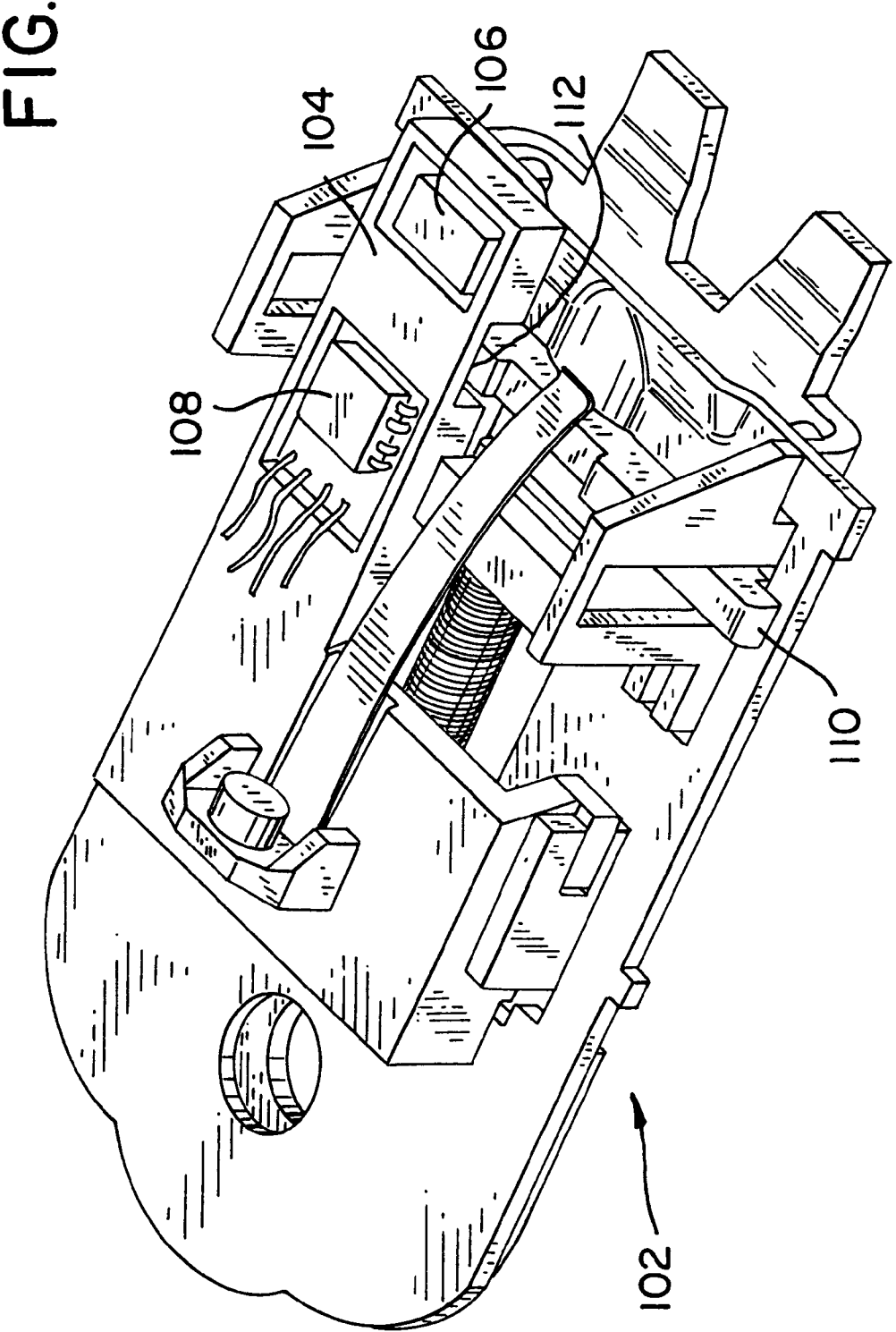
FIG. 9 is an isometric top view of another alternative embodiment of the seat buckle and sensor assembly of this invention.

Another alternative embodiment seat belt buckle and sensor assembly 102 is shown in FIG. 9. This embodiment uses the three-step motion illustrated in FIGS. 6 and 7. However, the device 102 has a GMR sensor package 104 which contains a magnet 106 and a GMR sensor 108 which is positioned behind the latch 110. The ferromagnetic latch 110 moves into and out of a gap 112 between the sensor 108 and the magnet 106. The displacement of the latch 110 away from the gap 112 results in decreased magnetic field strength at the sensor 108. Thus the three states: unlatched, latched with hasp present, shown in FIG. 6, and latched with hasp not present, shown in FIG. 7, can be differentiated.

It should be understood that while a sensor based on GMR technology is described herein, other types of magnetic field sensors such as Hall sensors and other solid state sensors as exist or may be developed could be used in the practice this invention.

It should also be understood that while a GMR sensor can be used with a reference voltage or current, the change in resistance of one or more GMR resistances can be determined directly with a circuit which functions as an ohmmeter.

It should be further understood that the gap between the GMR sensor and the magnet reduces the magnetic field strength sensed by the GMR sensor and that movement of a component of the seat belt buckle towards or away from, the gap is hereby defined as movement with respect to the magnet and the sensor which changes the sensed magnetic field. This movement may generally be a motion which physically fills the gap with a ferromagnetic body such that lines of magnetic flux are concentrated and thus the sensor reads a higher magnetic field. The reverse action of removing a ferromagnetic body from the gap will reduce the magnetic field read by the sensor. However, because of the complexity of the magnetic phenomena, the same result could be achieved by various motions of one or more ferromagnetic components. Such motions could include removal of a magnetic shunt, and motion of some part of a component towards and some part away from the physical gap.

It is understood that the invention is not limited to the particular construction and arrangement of parts herein illustrated and described, but embraces such modified forms thereof as come within the scope of the following claims.

We claim:

1. A seat belt buckle and latch indicator sensor comprising:
   a seat belt buckle;
   a flexible seat belt;
   a seat belt hasp connected to the seat belt, the hasp fitting within the seat belt buckle to releasably connect the seat belt to the buckle;
   a latch formed of ferromagnetic material mounted within the seat belt buckle, the latch being movable between an unlatched position a latched position in which the seat belt hasp is mechanically retained within the seat belt buckle, and a latched-without-a-hasp-present position;
   a magnetic field sensor fixedly mounted to the seat belt buckle; and
   a magnet having a magnetic field, the magnet being spaced from the magnetic field sensor and fixedly mounted to the seat belt buckle, the magnet and the sensor defining a gap therebetween, wherein the movement of the latch between the unlatched position, the latched position, and the latched-without-a-hasp position is such that the magnetic field sensed by the sensor changes.

2. The seat belt buckle and latch indicator of claim 1 wherein the latched position is closer to the gap than the unlatched position, and the latched-without-a-hasp position is closer to the gap than the latched position.

3. The seat belt buckle and latch indicator of claim 1 wherein the magnetic field sensor is a Giant Magnetoresistive sensor.

4. The seat belt buckle and latch indicator of claim 1 further comprising a ferromagnetic body, the body forming a hole for attaching the seat belt to a vehicle, the body forming an opening through which the latch moves, wherein the magnetic field sensor is positioned on one side of the opening through which the latch moves and the magnet is positioned on an opposite side so that the opening defines the gap between the sensor and the magnet.

5. The seat belt buckle and latch indicator of claim 1 further comprising a ferromagnetic body, the body forming a hole for attaching the seat belt to a vehicle, the body forming an opening through which the latch moves, and wherein the body also forms an opening through the body and positioned to overlie the seat belt hasp when the hasp is within the seat belt buckle, wherein the magnetic field sensor is mounted through the opening adjacent the hasp, and wherein the magnet which is spaced from the magnetic field sensor is also mounted through the opening adjacent the hasp.

6. The seat belt buckle and latch indicator of claim 1 wherein the magnetic sensor and magnet are positioned so that movement of the latch between the unlatched position and the latched position moves a portion of the latch away from the gap such that latching of the seat belt buckle decreases the magnetic field sensed by the sensor.

7. A seat belt buckle and latch indicator comprising:
   a seat belt buckle;
   a seat belt;
   a seat belt hasp connected to the seat belt, the hasp fitting within the seat belt buckle to join the seat belt to the buckle;
   a latch formed of ferromagnetic material mounted within the seat belt buckle, the latch being movable wherein the latch is movable between three positions, an unlatched position, a latched position, wherein the seat belt hasp is mechanically retained within the seat belt buckle, and a latched-without-a-hasp-present position;
   a magnetic field sensor fixedly mounted to the seat belt buckle;
   a magnet having a magnetic field, the magnet being spaced from the magnetic field sensor and fixedly mounted to the seat belt buckle, wherein a gap is defined between the magnet and the sensor;
   a means for changing the magnetic field at the sensor; wherein the attributes of the magnetic field detected at the magnetic sensor is detectably different for each of said three latch positions.

8. The seat belt buckle and latch indicator of claim 7 wherein the magnetic field sensor is a Giant Magnetoresistive sensor.

9. The seat belt buckle and latch indicator of claim 7 further comprising a ferromagnetic body, the body having portions defining a hole for attaching the seat belt to a vehicle, wherein the body has portions defining an opening through which the latch moves, and wherein the magnetic field sensor is positioned on one side of the opening through which the latch moves and the magnet is positioned on an opposite side so the opening defines the gap between the sensor and the magnet.

10. A seat belt buckle and latch status detector comprising:

a seat belt;

a ferromagnetic latching member connected to the seat belt, the latching member having portions defining a latch hole;

a buckle having a body with spaced plates which receive portions of the latching member therein, the latching member extending downward into the buckle;

a latch which is supported on the buckle body for displacement transverse to the latching member, the latch being movable between an unlatched position spaced from a body first plate and a latched position in which portions of the latch extend through the latch hole and through a slot in the first plate, the latch comprising a protuding nose which extends at least partially through the slot in the latched position and a face on either side of the nose which engage against the latching member in the latched position to restrain the transverse displacement of the latch, such that the nose protrudes to a greater extent through the slot when in a latched position with the latching member absent than when the latching member is present, and wherein the sensor is thereby able to detect a difference in magnetic field between a state in which the latching member is engaged within the buckle in a latched condition and a latched condition in which the latching member is not present in the buckle body;

a spring connected to the buckle body which urges the latch toward the latching member;

a magnet mounted to the buckle body in proximity to the slot through which the latch extends in the latched position; and a magnetic field sensor mounted to the seat belt buckle spaced from the magnet, such that a gap is defined between the sensor and the magnet into which portions of the latch extend in the latched position, such that the magnetic field detected by the sensor is different in the latch latched and unlatched positions, such that latching of the seat belt buckle changes the magnetic field detected by the sensor.

11. The seat belt buckle and latch status detector of claim 10 wherein the magnetic field sensor is a Giant Magnetoresistive sensor.

12. A seat belt buckle and latch indicator sensor comprising:

a seat belt buckle, the seat belt buckle having a ferromagnetic body;

a latch formed of ferromagnetic material mounted within the seat belt buckle, the buckle body having portions defining an opening through which the latch moves, the latch being movable between an unlatched position and a latched position in which a seat belt hasp is mechanically retained within the seat belt buckle;

said buckle body having a sensor opening;

a magnetic field sensor fixedly mounted to the buckle within the sensor opening and positioned therein to overlie the seat belt hasp when the hasp is retained within the seat belt buckle; and a magnet having a magnetic field, the magnet being spaced from the magnetic field sensor and fixedly mounted to the buckle, the magnet being mounted within the sensor opening to overlie the hasp, the magnet being spaced from the sensor to define a gap therebetween, wherein movement of the latch between the unlatched position and the latched position is such that latching of the seat belt buckle changes the magnetic field sensed by the sensor.

13. The seat belt buckle and latch indicator of claim 12 wherein the presence of the hasp changes the magnetic field sensed by the sensor.

14. The seat belt buckle and latch indicator of claim 12 wherein the magnetic field sensor is a Giant Magnetoresistive sensor.

* * * * *